(12) United States Patent
Guruswamy

(10) Patent No.: US 7,958,560 B1
(45) Date of Patent: Jun. 7, 2011

(54) PORTABLE PROGRAM FOR GENERATING ATTACKS ON COMMUNICATION PROTOCOLS AND CHANNELS

(75) Inventor: Kowsik Guruswamy, Sunnyvale, CA (US)

(73) Assignee: Mu Dynamics, Inc., Sunnyvale, CA (US)

( * ) Notice: Subject to any disclaimer, the term of this patent is extended or adjusted under 35 U.S.C. 154(b) by 1326 days.

(21) Appl. No.: 11/351,409

(22) Filed: Feb. 10, 2006

Related U.S. Application Data

(60) Provisional application No. 60/662,430, filed on Mar. 15, 2005.

(51) Int. Cl.
*G06F 21/00* (2006.01)
*G06F 11/30* (2006.01)
*G06F 15/16* (2006.01)

(52) U.S. Cl. .............................. 726/25; 726/23; 709/224

(58) Field of Classification Search .................. 713/201; 726/22–25; 709/221–224
See application file for complete search history.

(56) References Cited

U.S. PATENT DOCUMENTS

| | | | |
|---|---|---|---|
| 5,892,903 A | 4/1999 | Klaus | |
| 6,088,804 A * | 7/2000 | Hill et al. | 726/25 |
| 6,584,569 B2 | 6/2003 | Reshef et al. | |
| 7,152,105 B2 * | 12/2006 | McClure et al. | 709/224 |
| 7,178,166 B1 * | 2/2007 | Taylor et al. | 726/25 |
| 7,243,148 B2 * | 7/2007 | Keir et al. | 709/224 |
| 7,257,630 B2 * | 8/2007 | Cole et al. | 709/224 |
| 7,315,801 B1 * | 1/2008 | Dowd et al. | 703/13 |
| 7,509,675 B2 | 3/2009 | Aaron | |
| 7,543,056 B2 * | 6/2009 | McClure et al. | 709/224 |
| 7,624,422 B2 * | 11/2009 | Williams et al. | 726/1 |
| 7,627,891 B2 * | 12/2009 | Williams et al. | 726/1 |
| 7,627,900 B1 * | 12/2009 | Noel et al. | 726/25 |
| 7,664,845 B2 * | 2/2010 | Kurtz et al. | 709/224 |
| 7,673,043 B2 * | 3/2010 | Keir et al. | 709/224 |
| 2001/0034847 A1 | 10/2001 | Gaul, Jr. | |
| 2003/0051163 A1 * | 3/2003 | Bidaud | 713/201 |
| 2003/0154399 A1 | 8/2003 | Zuk et al. | |
| 2003/0159063 A1 * | 8/2003 | Apfelbaum et al. | 713/200 |
| 2004/0230881 A1 * | 11/2004 | Gwak | 714/728 |
| 2005/0044418 A1 | 2/2005 | Miliefsky | |
| 2005/0273772 A1 * | 12/2005 | Matsakis et al. | 717/136 |
| 2005/0273859 A1 * | 12/2005 | Chess et al. | 726/25 |
| 2006/0005231 A1 | 1/2006 | Zuk et al. | |
| 2006/0015941 A1 * | 1/2006 | McKenna | 726/23 |
| 2006/0015943 A1 * | 1/2006 | Mahieu | 726/25 |
| 2006/0021034 A1 * | 1/2006 | Cook | 726/22 |
| 2006/0021044 A1 * | 1/2006 | Cook | 726/25 |
| 2006/0021045 A1 * | 1/2006 | Cook | 726/25 |
| 2006/0021046 A1 * | 1/2006 | Cook | 726/25 |

(Continued)

OTHER PUBLICATIONS

Sorensen, S., "Intrusion Detection and Prevention: Protecting Your Network from Attacks," Document No. 200065-002, 2006, [online] [Retrieved on May 12, 2006] Retrieved from the Internet <URL: http://www.juniper.net/solutions/literature/white_papers/200065. pdf>.

(Continued)

*Primary Examiner* — Christopher A Revak
(74) *Attorney, Agent, or Firm* — K&L Gates LLP

(57) ABSTRACT

A security analyzer is capable of generating attacks to test the security of a device under analysis. The security analyzer further has the capability to generate a portable, executable program to generate specified attacks. In this way, others can recreate the attacks without requiring access to the security analyzer.

21 Claims, 2 Drawing Sheets

U.S. PATENT DOCUMENTS

| | | | |
|---|---|---|---|
| 2006/0021047 A1* | 1/2006 | Cook | 726/25 |
| 2006/0021048 A1* | 1/2006 | Cook et al. | 726/25 |
| 2006/0021049 A1* | 1/2006 | Cook | 726/25 |
| 2006/0098579 A1* | 5/2006 | Chang et al. | 370/242 |
| 2006/0137009 A1* | 6/2006 | Chesla | 726/22 |
| 2006/0277606 A1* | 12/2006 | Yunus et al. | 726/25 |
| 2007/0011319 A1* | 1/2007 | McClure et al. | 709/224 |
| 2007/0094728 A1 | 4/2007 | Julisch et al. | |
| 2008/0005555 A1* | 1/2008 | Lotem et al. | 713/150 |
| 2008/0092237 A1* | 4/2008 | Yoon et al. | 726/25 |
| 2008/0098479 A1* | 4/2008 | O'Rourke et al. | 726/25 |
| 2009/0320137 A1* | 12/2009 | White et al. | 726/25 |
| 2009/0328190 A1* | 12/2009 | Liu et al. | 726/14 |
| 2010/0284282 A1* | 11/2010 | Golic | 370/242 |
| 2010/0284283 A1* | 11/2010 | Golic et al. | 370/242 |

OTHER PUBLICATIONS

PCT International Search Report and Written Opinion, PCT/US06/09512, Aug. 31, 2006, 7 pages.

* cited by examiner

PORTABLE PROGRAM FOR GENERATING ATTACKS ON COMMUNICATION PROTOCOLS AND CHANNELS

REFERENCE TO RELATED APPLICATIONS

This application claims priority from the following provisional application, which is hereby incorporated by reference in its entirety: U.S. Application No. 60/662,430, filed on Mar. 15, 2005, entitled "Automated Robustness and Security Testing of Network Devices". This application is related to the following utility applications, which are hereby incorporated by reference in their entirety: U.S. application Ser. No. 11/351,403, filed on Feb. 10, 2006, entitled "Platform for Analyzing the Security of Communication Protocols and Channels" and U.S. application Ser. No. 11/351,402, filed on Feb. 10, 2006, entitled "Analyzing the Security of Communication Protocols and Channels for a Pass-Through Device".

BACKGROUND

The present invention relates to a security analyzer that attacks a device by sending messages to it.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

A proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. For example, a security analyzer sends one or more messages (test messages) to the DUA, and the DUA's response is observed. A response can include, for example, registering an error or generating a message (response message). The DUA can then send the generated message to the security analyzer. Depending on the analysis being performed, the security analyzer might send another message to the DUA upon receiving the message from the DUA.

If the security analyzer discovers a vulnerability in the DUA, the vulnerability can be addressed by the DUA's development team. The development team will likely want to observe the vulnerability first-hand by recreating the attack on the DUA. One solution is to use the security analyzer to recreate the attack. However, since the security analyzer has many capabilities beyond generating merely one attack, using the security analyzer for this task would be a poor use of resources. In addition, the development team may not have access to the security analyzer, for example if the analysis team is at a different location than the development team, and purchasing a separate security analyzer for the development team may not be a good use of resources. Another solution is to recreate the attack manually, by creating the messages and sending them to the DUA. However, this is a tedious and error-prone process. What is needed is a way to recreate the attack easily but without using the security analyzer.

SUMMARY

The present invention overcomes limitations of the prior art by providing a security analyzer for analyzing a security of a device under analysis (DUA). In one embodiment, the security analyzer is an appliance that is capable of generating attacks to test the security of a device under analysis. The appliance further has the capability to generate a portable, executable program to generate specified attacks. In this way, others can recreate the attacks without requiring access to the appliance.

In another aspect, a method for testing a security of a device under analysis (DUA) includes the following steps. Attack(s) are generated to probe the security of the DUA. Based on the attacks, certain security vulnerabilities may be identified. Corresponding executable programs are generated that, when executed, will recreate the attack(s).

Other aspects of the invention include software, systems, components and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

A security analyzer tests a device-under-analysis (DUA) by sending one or more test messages to the DUA, possibly receiving one or more response messages from the DUA, and then possibly continuing the message exchange with the DUA. Recreating an attack, therefore, would include sending one or messages to the DUA, possibly receiving one or more messages from the DUA, and then possibly sending more messages back and forth to the DUA. The security analyzer could be used to do this, but this often is not a good use of the security analyzer.

Instead, in one embodiment, the attack is recreated by running an executable program. The program is stand-alone, in that it can be run without the security analyzer being present. The program is also portable, such that it can be transferred easily and run on various devices. The program also hides some of the security analyzer's internals, which makes the program easier to use and helps protect any proprietary information that is used inside the security analyzer.

In one approach, the security analyzer itself is used to generate the executable program. For example, the security analyzer may be a portable appliance that can be transported to different locations to analyze the security of different devices. The analysis team may be operating the security analyzer to test a DUA when they identify a security vulnerability. They want the development team to be able to recreate the attack that led to the vulnerability but the development team may not have access to a security analyzer. Therefore, the analysis team uses the security analyzer to generate an executable program that can generate the attack. The analysis team then gives this program to the development team, which can then generate the attack.

Figure 1:
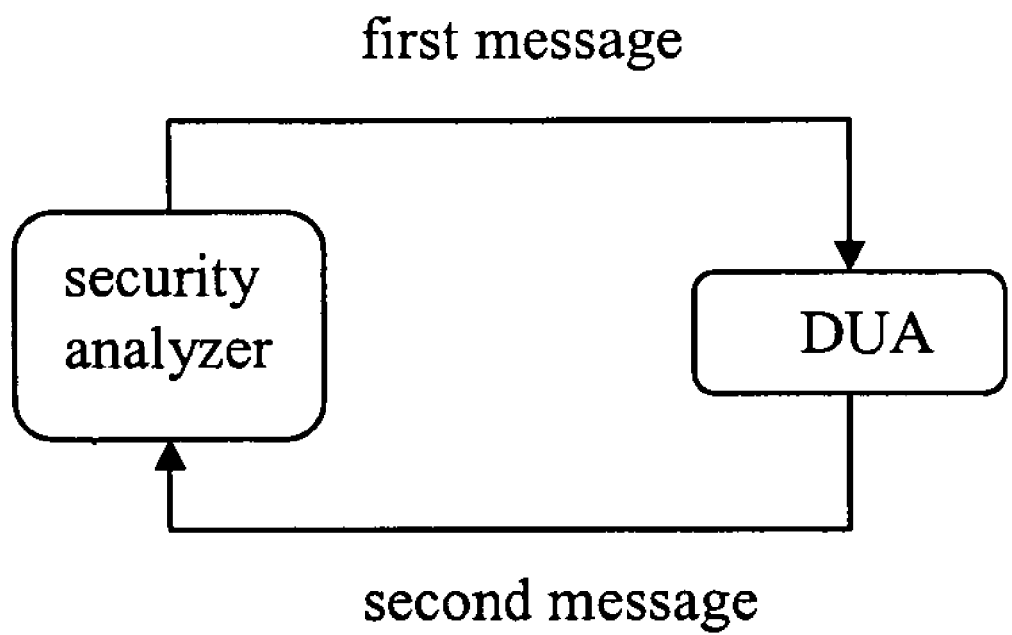
FIG. 1 illustrates a system that includes a security analyzer, a device-under-analysis, a first test message, and a second response message, according to one embodiment of the invention.

In the following description, "device", "device-under-analysis", and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA can also be multiple devices that are communicatively coupled to form a system or network of devices. For example, a DUA can be two firewall devices that establish an encrypted tunnel between themselves. There can also be devices located between the security analyzer and the DUA, although FIG. 1 omits such devices for clarity.

In one embodiment, a security analyzer tests the communication protocols and/or channels of a device. A "protocol" refers to an exchange of data or messages in a known, structured format. Specifically, a protocol refers to what is being communicated (for example, the data or message content). A security analyzer can test various types of communication protocols, regardless of whether they are public or proprietary. Types of protocols include, for example, networking protocols (including network packets), application program interfaces (APIs; including API calls, remote method invocation (RMI), and remote procedure call (RPC)), and file formats. Appendix A contains exemplary networking protocols, APIs, and file formats.

A protocol generally has three characteristics: structure, semantics, and state. Therefore, when a security analyzer tests a protocol, it tests the protocol's structure, semantics, and/or state. Protocol structure refers to the layout of a message, such as its fields, arguments, or parameters, and its possible length. Protocol semantics refers to the context of a message, such as its actual content and what the content means. Protocol state refers to how the history of previous messages affects later messages. Appendix B contains types of attacks to test a protocol's structure, semantics, and/or state.

A "channel" refers to how protocol data is communicated. Specifically, a channel refers to how a message is delivered to a DUA (for example, using Ethernet on top of a wireless network). One example of a channel attack is sending too many messages at once, thereby flooding a network and resulting in a denial of service (DoS).

In one embodiment, a security analyzer can also test a DUA's overall security. These types of attacks include, for example, negotiating a lower (i.e., less secure) encryption algorithm, dictionary attacks (brute forcing commonly-used passwords), resource exhaustion, identifying misconfiguration of the DUA, identifying mechanisms for sending messages through the DUA that bypass various security checks, and detecting insecure implementations of standard protocols and information disclosure.

Although the embodiments below focus on an executable program for attacking a device by sending messages to it, the notion of a stand-alone program replacing a device or system can be used in many different situations. For example, rather than using a device or system that is complex, feature-rich, or more expensive, it can make sense to substitute a stand-alone program that is simpler, more portable, has fewer features, or is cheaper. Also, a compact or compiled stand-alone program can help protect proprietary information that might be more visible in a large system or device.

In one embodiment, the security analyzer and the executable program represent an attack internally as a context-free grammar or as an attribute grammar. The grammar specifies the syntax or structure of one or more messages to be sent to the DUA. If there are multiple messages, the grammar can also specify their order (for example, the order in which they should be sent to the DUA). In one embodiment, a grammar represents a set of messages that have a related syntax. In this embodiment, a grammar can be thought of as a message "template," and an actual message would be an instantiation of a grammar.

The grammar can be expressed in different ways. In one embodiment, the grammar is expressed using Backus Naur Form (BNF). In another embodiment, the grammar is expressed as a rooted graph. In one embodiment, if a graph represents multiple messages, then each message corresponds to a sub-graph within the larger graph. The way in which the sub-graphs are connected corresponds to the order of the messages.

Figure 2:
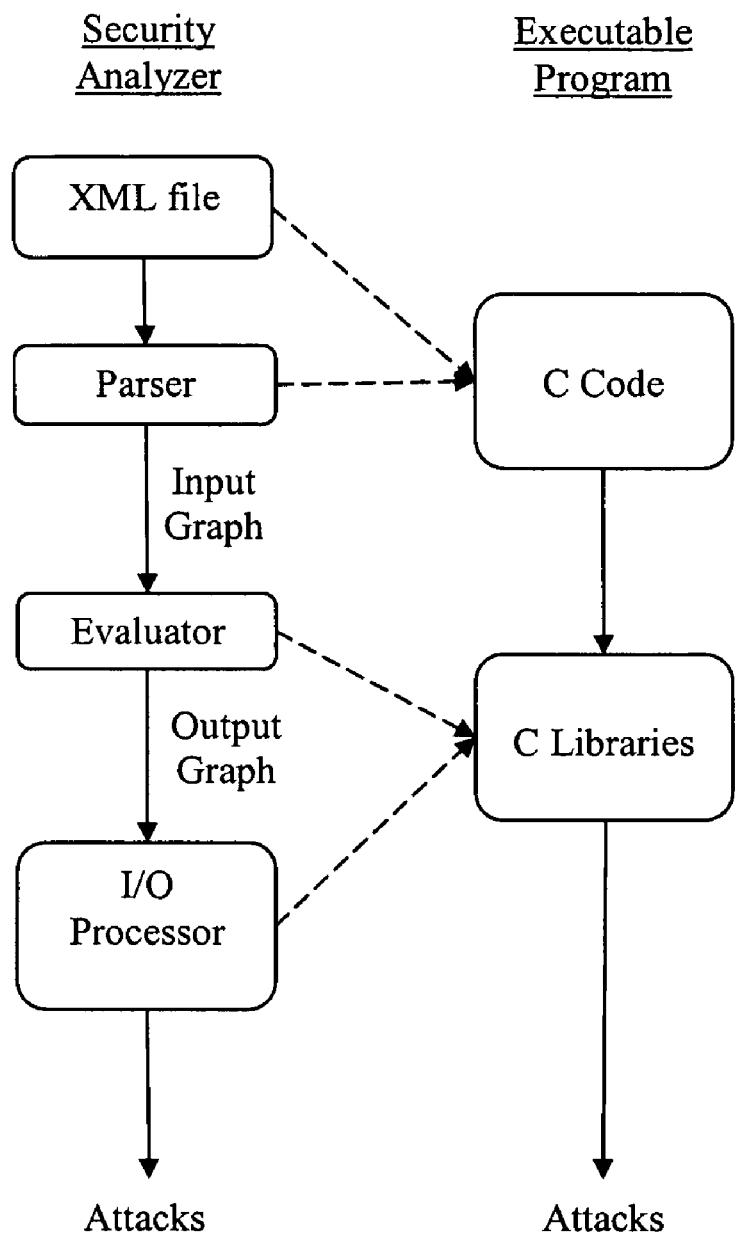
FIG. 2 illustrates a security analyzer capable of generating an attack, and also capable of generating a portable program that can generate the attack.

In one embodiment, shown in FIG. 2, the security analyzer generates a rooted graph automatically using a parsing program that parses an eXtensible Markup Language (XML) file. The XML file encodes knowledge of message syntax. In one embodiment, if self-describing messages are involved, the XML file is of a standard form such as a Document Type Definition (DTD) or an Interface Definition Language (IDL).

This rooted graph also references one or more rules. A rule specifies how to generate a semantic element of a message. For example, a checksum rule specifies how to compute an Internet Protocol (IP) checksum of a portion of a message. As another example, a compression rule specifies how to transform a portion of a message so that the portion is compressed. One example of a mal-formed message is a message where the value of a semantic element is incorrect or missing. For example, a semantic element that is supposed to represent the length of a portion of a message can have a negative value.

Once the rooted graph ("input graph") has been generated, it is evaluated. Evaluation comprises applying the various rules that are associated with the graph. For example, the rooted graph is traversed. At each node, the appropriate rule is invoked to generate a semantic element in order to build an output graph.

The output graph is then subjected to I/O processing in order to generate a final message to send to the DUA. In one embodiment, I/O processing generates a byte code according to a particular communication protocol, such as Transmission Control Protocol (TCP).

In summary, in one embodiment, the security analyzer generates a message as follows: An XML file is parsed to create an input graph. The input graph is evaluated to create an output graph. The output graph is I/O processed to create the message (i.e., attack).

Alternately, as shown in FIG. 2, an executable program can be used to generate the message. In one embodiment, the security analyzer generates the program. The program differs from the security analyzer in several ways. First, the program does not use an XML file and a parser to create an input graph. Instead, the program uses compiled code (e.g., C++ code) to create the input graph. Second, the program does not include an evaluator and I/O processing as such. Instead, the C++ code used to create the input graph is compiled with various libraries that provide the evaluation and I/O processing functionality.

In this way, the executable program shields its user from the internals of the security analyzer, including the XML file, the parser, the evaluator, and the I/O processor.

In one embodiment, the C++ code and libraries are compiled differently based on the environment in which the program will be run (for example, on a UNIX operating system versus a Microsoft Windows operating system).

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein. °

APPENDIX A

Networking protocols include, for example, Address Resolution Protocol (ARP), Border Gateway Protocol (BGP), Cisco Discovery Protocol (CDP), Dynamic Host Configuration Protocol (DHCP), File Transfer Protocol (FTP), Trivial File Transfer Protocol (TFTP), HyperText Transfer Protocol (HTTP), Internet Control Message Protocol (ICMP), Internet Protocol version 4 (IPv4), Internet Protocol version 6 (IPv6), Internet Security Association and Key Management Protocol (ISAKMP), Light Weight Directory Access Protocol (LDAP), Open Shortest Path First (OSPF), Post Office Protocol 3 (POP3), Remote Authentication Dial-In User Service (RADIUS; including extensions from Cisco Systems, Juniper Networks, and Microsoft), Routing Information Protocol (RIP), Session Initiation Protocol (SIP), Server Message Block (SMB), Remote Administration Protocol (RAP), Simple Mail Transfer Protocol (SMTP), Multipurpose Internet Mail Extension (MIME), Simple Network Management Protocol (SNMP; including SNMP trap), Secure Shell (SSH), Secure Sockets Layer (SSL), Transport Layer Security (TLS), Terminal Access Controller Access Control System Plus (TACACS+), Transmission Control Protocol (TCP), Universal Plug and Play (UPnP), User Datagram Protocol (UDP), and Voice over Internet Protocol (VoIP). Networking protocols also include, for example, any protocol defined by an Internet Engineering Task Force (IETF) Request for Comments (RFC).

Application program interfaces (APIs) include, for example, ActiveX, Common Object Request Broker Architecture (CORBA), Interface Definition Language (IDL), Internet Inter-ORB Protocol (HOP), Java Remote Method Invocation (Java RMI), Management Information Base (MIB), Server Message Block (SMB), Simple Object Access Protocol (SOAP), and Sun Microsystems Remote Procedure Call (SunRPC; including portmapper and statd).

File formats include, for example, image formats, audio formats, multimedia formats, and text formats. Image file formats include, for example, Graphic Interchange Format (GIF), Joint Photographic Experts Group (JPEG), Microsoft Windows Bitmap (BMP), Portable Document Format (PDF), Portable Network Graphics (PNG), and Tagged Image File Format (TIFF). Audio file formats include, for example, MPEG-1 Audio Layer 3 (MP3; Moving Picture Experts Group), MPEG-2 Part 7 (AAC; Advanced Audio Coding), Microsoft Windows Media Audio (WMA), and RealNetworks RealAudio. Multimedia formats include, for example, Apple QuickTime, Microsoft Windows Media Video (WMV), and Adobe Flash. Text file formats include, for example, Document Type Definition (DTD), eXtensible Markup Language (XML), X. 509 (public key certificates), and Microsoft Word (DOC).

APPENDIX B

Structure attacks are generally based on messages that contain values or parameters that violate an intended protocol. Types of structure attacks include, for example: emptyfield, empty-message, extra-data, incomplete, invalid-count, invalid-enum (enumeration), invalid-eol (end-of-line), invalid-field, invalid-index, invalid-length, invalid-offset, invalid-syntax, invalid-type, invalid-utf8 (Unicode Transformation Format), missing-data, missing-field, mixed-case, overflow, repeated-field, too-many-fields, truncated, underflow, and wrong-encoding.

One example of a semantics attack is a message that indicates an invalid (e.g., non-existent) printer instead of a valid printer. This can cause a software application to hang or crash unexpectedly. Another example of a semantics attack is a network packet with a source IP address of "all-broadcast." Responding to this packet would therefore generate enough packets to flood the network. Types of structure attacks include, for example: fmt-string (format), fragmented-field, invalid-encoding, invalid-field, invalid-ip (IP address), invalid-path, invalid-string, recursion, self-reference, and null-char (character).

One example of a state attack is sending messages out-of-order (e.g., with respect to the type of message the DUA is expecting to receive).

What is claimed is:

1. A security analyzer device for attacking a network device under analysis (DUA) and generating an executable program for recreating on another computing device an attack that triggered a vulnerability of the DUA to protocol abuse of a network communication protocol, comprising:
a computer processor for executing computer program instructions; and
a computer-readable storage medium having executable computer program instructions for a single software application tangibly embodied thereon, the executable computer program instructions for the computer processor to perform the steps of:
generating a plurality of malformed test messages of the network communication protocol, comprising:
generating a rooted graph expressing a message syntax of the network communication protocol, the message syntax specifying a plurality of semantic elements in messages of the network communication protocol, the rooted graph referencing a plurality of rules specifying how to generate a semantic element for a message of the communication protocol,
traversing the rooted graph and applying the referenced rules, to generate an output graph, and
traversing the output graph to generate the plurality of malformed test messages, the test messages malformed with respect to the network communication protocol;
generating multiple attacks on the DUA, the attacks comprising sending the malformed test messages to the DUA;
receiving response messages from the DUA in response to the malformed test messages;
analyzing the malformed test messages and response messages to identify an attack that triggers the vulnerability in the DUA; and
generating the executable program that, when executed by the other computing device, will recreate the identified attack that triggers the vulnerability in the DUA.

2. The security analyzer device of claim 1, wherein generating the rooted graph further comprises parsing a description of the message syntax of the network communication protocol to generate the rooted graph.

3. The security analyzer device of claim 2, wherein the description of the message syntax further comprises a file in eXtensible Markup Language (XML) format.

4. The security analyzer device of claim 3, wherein a format of the file includes at least one of Document Type Definition (DTD) or Interface Definition Language (IDL).

5. The security analyzer device of claim 1, wherein each of the malformed test messages is represented by a sub-graph within the output graph, and the malformed test messages are sent to the DUA in the order that said sub-graphs are connected to each other in the output graph.

6. The security analyzer device of claim 1, wherein generating the plurality of malformed test messages further comprises input/output processing the output graph to generate the plurality of malformed test messages.

7. The security analyzer device of claim 6, wherein each of the plurality of malformed test messages comprises a byte code according to the network communication protocol.

8. The security analyzer device of claim 1, wherein generating the executable program further comprises generating source code of the executable program, and wherein the executable program generates a graph that represents only the malformed test messages of the identified attack.

9. The security analyzer device of claim 8, wherein generating the executable program further comprises:
generating a code library; and
compiling the source code with the code library,
wherein the compiled code is configured to generate the identified attack when executed.

10. The security analyzer device of claim 9, wherein compiling the source code with the code library further comprises compiling the source code with the code library based on an environment in which the compiled code will be executed.

11. A method for a security analyzer device to attack a network device under analysis (DUA) and generate an executable program for recreating on another computing device an attack that triggered a vulnerability of the DUA to protocol abuse of a network communication protocol, the method comprising the security analyzer device performing the steps of:
generating a plurality of malformed test messages of the network communication protocol, comprising:
generating a rooted graph expressing a message syntax of the network communication protocol, the message syntax specifying a plurality of semantic elements in messages of the network communication protocol, the rooted graph referencing a plurality of rules specifying how to generate a semantic element for a message of the communication protocol,
traversing the rooted graph and applying the referenced rules, to generate an output graph, and
traversing the output graph to generate the plurality of malformed test messages, the test messages malformed with respect to the network communication protocol;
generating multiple attacks on the DUA, the attacks comprising sending the malformed test messages to the DUA;
receiving response messages from the DUA in response to the malformed test messages;
analyzing the malformed test messages and response messages to identify an attack that triggers the vulnerability in the DUA; and
generating the executable program that, when executed by the other computing device, will recreate the identified attack that triggers the vulnerability in the DUA.

12. The method of claim 11, wherein generating the rooted graph further comprises parsing a description of the message syntax of the network communication protocol to generate the rooted graph.

13. The method of claim 12, wherein the description of the message syntax further comprises a file in eXtensible Markup Language (XML) format.

14. The method of claim 13, wherein a format of the file includes at least one of Document Type Definition (DTD) or Interface Definition Language (IDL).

15. The method of claim 11, wherein each of the malformed test messages is represented by a sub-graph within the output graph, and the malformed test messages are sent to the DUA in the order that said sub-graphs are connected to each other in the output graph.

16. The method of claim 11, wherein generating the plurality of malformed test messages further comprises input/output processing the output graph to generate the plurality of malformed test messages.

17. The method of claim 16, wherein each of the plurality of malformed test messages further comprises a byte code according to the network communication protocol.

18. The method of claim 11, wherein generating the executable program comprises generating source code of the executable program, and wherein the executable program is configured to generate a graph that represents only the malformed test messages of the identified attack.

19. The method of claim 18, wherein generating the executable program further comprises:
generating a code library; and
compiling the source code with the code library,
wherein the compiled code is configured to generate the identified attack when executed.

20. The method of claim 19, wherein compiling the source code with the code library further comprises compiling the source code with the code library based on an environment in which the compiled code will be executed.

21. A computer-readable storage device having embodied thereon executable computer program instructions for a security analyzer device to attack a network device under analysis (DUA) and generate an executable program for recreating on another computing device an attack that triggered a vulnerability of the DUA to protocol abuse of a network communication protocol, the executable computer program instructions comprising instructions for performing the steps of:
generating a plurality of malformed test messages of the network communication protocol, comprising:
generating a rooted graph expressing a message syntax of the network communication protocol, the message syntax specifying a plurality of semantic elements in messages of the network communication protocol, the rooted graph referencing a plurality of rules specifying how to generate a semantic element for a message of the communication protocol,
traversing the rooted graph and applying the referenced rules, to generate an output graph, and
traversing the output graph to generate the plurality of malformed test messages, the test messages malformed with respect to the network communication protocol;
generating multiple attacks on the DUA, the attacks comprising sending the malformed test messages to the DUA;
receiving response messages from the DUA in response to the malformed test messages;
analyzing the malformed test messages and response messages to identify an attack that triggers the vulnerability in the DUA; and
generating the executable program that, when executed by the other computing device, will recreate the identified attack that triggers the vulnerability in the DUA.

\* \* \* \* \*